United States Patent [19]
Wolfe et al.

[11] Patent Number: 5,429,009
[45] Date of Patent: Jul. 4, 1995

[54] ROBOT WITH CRUCIFORM GEOMETRY

[75] Inventors: Court L. Wolfe; Mel Siegel, both of Pittsburgh; Christopher J. Alberts, Monroeville; Williams M. Kaufman, Pittsburgh, all of Pa.

[73] Assignee: Carnegie Mellon University, Pittsburgh, Pa.

[21] Appl. No.: 64,968

[22] Filed: May 20, 1993

[51] Int. Cl.⁶ .................... G01M 19/00; B25J 5/00
[52] U.S. Cl. ................... 73/865.8; 180/8.5; 901/1
[58] Field of Search ........... 73/865.8, 866.5; 901/1, 901/41, 44; 414/749; 180/8.1, 8.5, 8.6; 33/503, 504, 505

[56] References Cited

U.S. PATENT DOCUMENTS

| | | | |
|---|---|---|---|
| 4,170,891 | 10/1979 | Elsner | 901/44 |
| 4,321,976 | 3/1982 | Reinke et al. | 180/8.5 |
| 4,325,026 | 4/1982 | Cooper, Jr. et al. | 901/44 |
| 4,472,782 | 9/1984 | Suzuki | 33/505 |
| 4,674,949 | 6/1987 | Kroczynski . | |
| 4,790,400 | 12/1988 | Sheeter | 180/8.6 |
| 4,799,170 | 1/1989 | Nakaya et al. | 33/504 |
| 4,901,256 | 2/1990 | McMurtry et al. | 33/503 |
| 4,940,382 | 7/1990 | Castelain et al. . | |
| 5,047,966 | 9/1991 | Crow et al. | 33/504 |

FOREIGN PATENT DOCUMENTS

| | | | |
|---|---|---|---|
| 0278536 | 5/1990 | Germany | 414/749 |
| 0128082 | 7/1985 | Japan | 901/1 |
| 0206791 | 10/1985 | Japan | 180/8.5 |
| 2263207 | 10/1990 | Japan | 901/44 |
| 0104785 | 5/1991 | Japan | 180/8.6 |
| 0653943 | 1/1986 | Switzerland | 901/41 |

OTHER PUBLICATIONS

Computer Motor L Drive User Guide, Compumotor Division of Parker Hannifin Corporation, Chapter 1, p. 3.

Unislide Motor Driven Positioning Systems Catalog M-92 of Velmex, Inc., p. 12.

"Terrain Interaction with the Quarter Scale Beam Walker" by W. Chun, S. Price and A. Spiessbach of Martin Marietta Space Systems Co., SPIE-International Society for Optical Engineering, vol. 1195, Mobile Robots IV, 1989.

"Design and Construction of a Quarter Scale Model of the Walking Beam" by W. Chun, S. Price and A. Spiessbach of Martin Marietta Space Systems Co., ISA Instrument Society of America, vol. 20, Modeling and Simulation, 1989.

Primary Examiner—Hezron E. Williams
Assistant Examiner—Daniel S. Larkin
Attorney, Agent, or Firm—Buchanan Ingersoll; Robert J. Pugh

[57] ABSTRACT

A movable robot for performing tasks upon and traversing a work surface. The robot having a first support means having a longitudinal axis. The first support means have first gripping means extending therefrom for detachable adhering the first support means to the work surface. The robot further having at least one second support means movably coupled to the first support means. Respective second gripping means extend from each second support means for detachable adhering the second support means to the work surface. The first and second gripping means are capable of being moved relative to one another both in a direction parallel to the longitudinal axis and along a line that intersects the longitudinal axis. At least one tool is attached to one or more of the first and second support means.

19 Claims, 12 Drawing Sheets

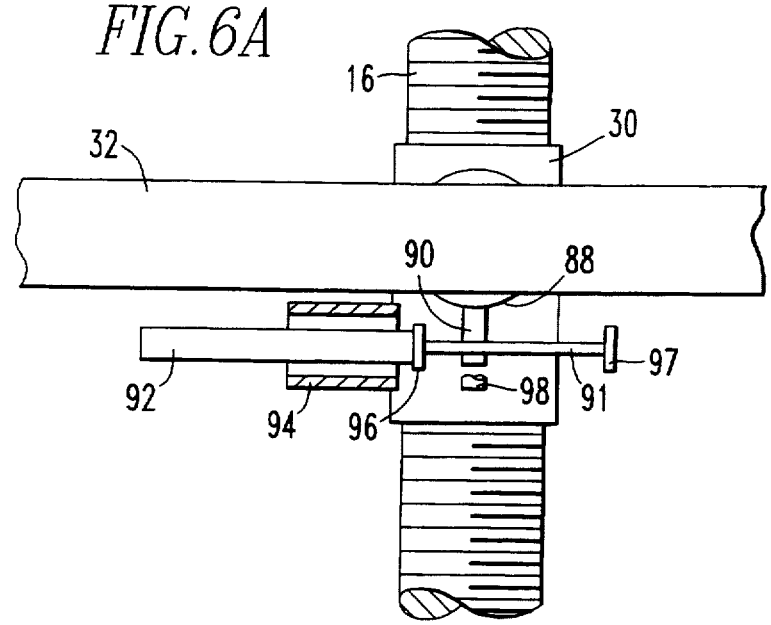
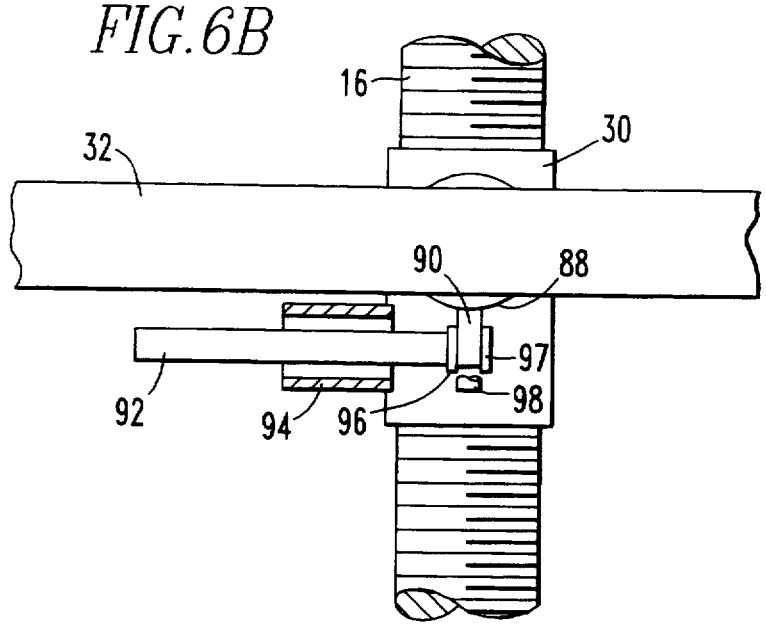

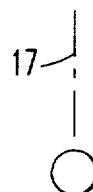
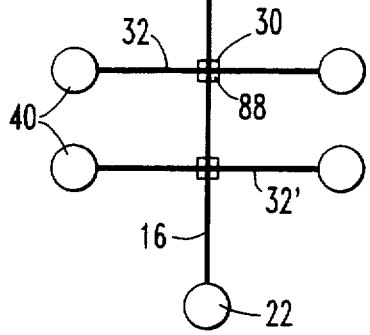
FIG.11A
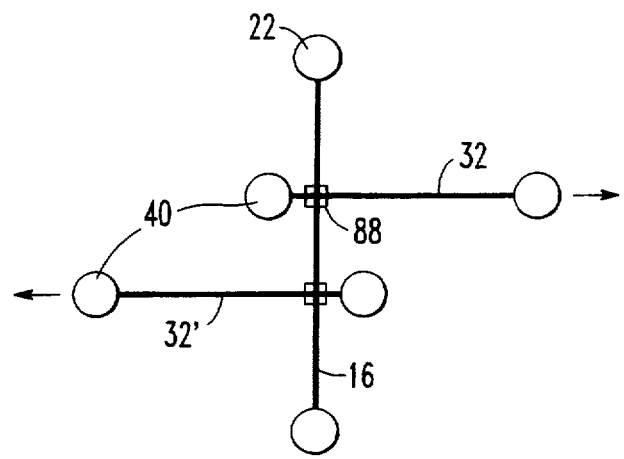
FIG.11B
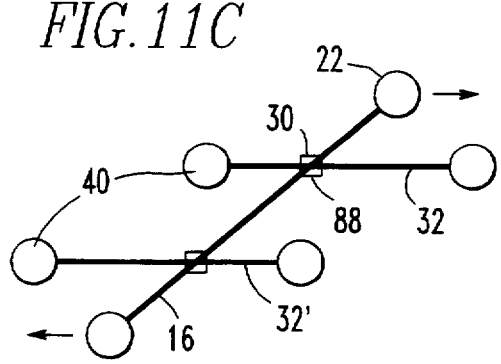
FIG.11C
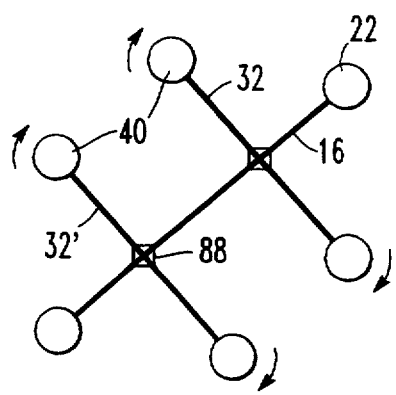
FIG.11D

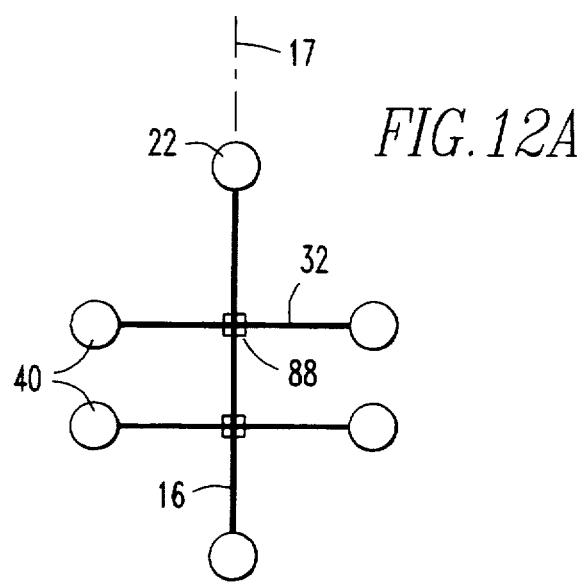
FIG.12A
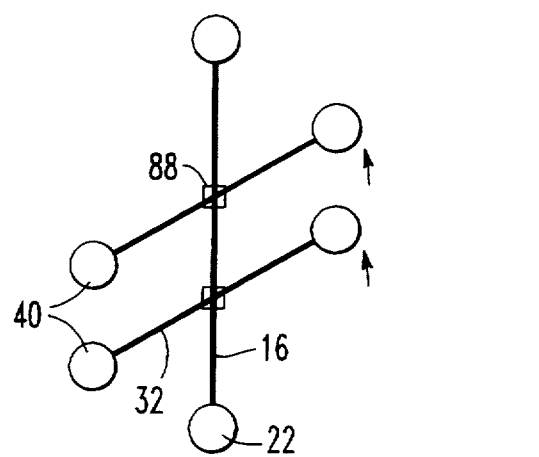
FIG.12B
FIG.12C
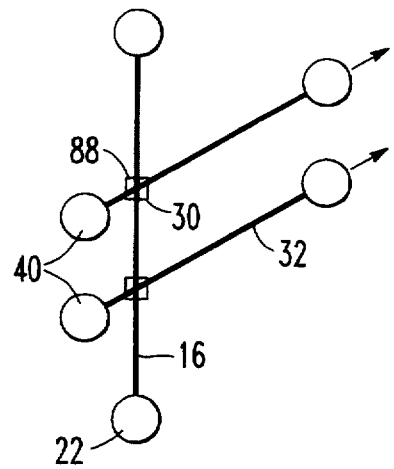
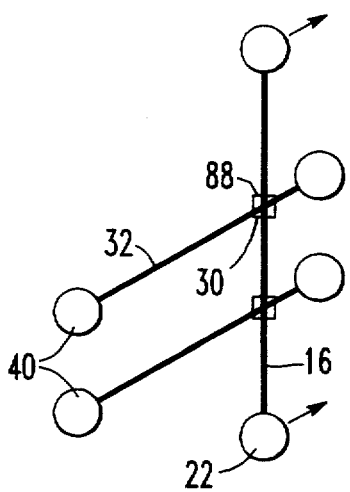
FIG.12D

ROBOT WITH CRUCIFORM GEOMETRY

This invention was made with government support under Grant No. 93-G-013 awarded by the Federal Aviation Administration and Grant No. G319014 awarded by the Department of the interior. The government has certain rights in the invention.

BACKGROUND OF THE INVENTION

1. Field of the Invention

This invention relates generally to an independent moving body traversing a surface having a random orientation, and more particularly for such an apparatus that may perform tasks upon such surfaces.

2. Description of the Prior Art

Present day inspection means include eddy current and ultrasonic probes, X-ray and other penetrating radiation methods and visual inspections. Such inspection means have a wide variety of applications. Cargo containers, ship hulls and aircraft skins are just some examples of surfaces which are inspected in order to monitor their structural integrity or the contents thereof. Often, unfriendly environments such as those associated with hazardous waste containers, fuel containers and nuclear vessels prevent human entry for a visual inspection. For some situations, visual inspections can be unreliable or not repeatable.

Improvements in inspection techniques are of particular interest to the aircraft industry. Aircraft skins inflate and deflate with each cycle of pressurization on take off and depressurization on landing. The resulting stress to the aircraft skin may cause several kinds of damage. Radial cracks can develop around rivets and delamination of adhesive bonded skin joints can occur. The tendency of the skin joints to delaminate is exacerbated by corrosion. Obviously as an aircraft ages, the aircraft undergoes continued cycling and the risk of aircraft skin damage is increased. Such skin damage is exacerbated by corrosion.

The aging aircraft problem is currently being addressed in the aircraft industry through periodic inspection of known problem areas on each aircraft type. A great majority of current skin inspection activity is conducted visually by inspectors trained for the task. The remaining inspection techniques involve instruments employing eddy current probes and instruments employing ultrasonic probes. Although X-ray and other penetrating radiation methods have been used for the detection of fatigue cracks in the deep structural and rotating components below the skin (related more to flying hours than to cycles), such penetrating methods are not typically employed for commercial aviation skin inspection.

Because a majority of present inspection techniques involve manual activity, inspection results may vary due to human error and lack of concentration. Also, because present inspection techniques are conducted manually, an inspector may not perform inspections in an identical fashion each time and different inspectors may perform the inspections differently. Furthermore, the duration of manual inspections is relatively long and requires that the aircraft be out of service which can disrupt schedules. These shortcomings in manual inspections are common to all industries in which manual inspections are employed and are not limited to the aircraft industry.

U.S. Pat. No. 4,940,382 discloses "an autonomous moving body [robot] able to move a working tool at a constant speed over a surface having a random shape and orientation." Some of the uses described for the robot of the '382 patent include cleaning, pumicing, painting or decorating the outer surface of an aircraft. The robot of the '382 patent has a generally rectangular first support structure having a longitudinal axis. The '382 robot also has a second support structure movably connected to the first support structure so that the first and second support structures may move relative to one another in a direction parallel to the longitudinal axis of the first support structure. The robot of the '382 patent further has a rotatable element so that the first and second support structures may be rotated relative to one another about a vertical center axis.

U.S. Pat. No. 4,674,949 discloses a "self-contained apparatus able to move along a nonhorizontal surface." Each embodiment disclosed in the '949 patent includes a first support structure having a longitudinal axis. The '949 robot further has a second support structure in which the first and second support structure are capable of moving relative to one another in a direction parallel to the longitudinal axis of the first support structure.

Neither the '949 patent nor the '382 patent describe robots having the ability to move a first support structure and a second support structure relative to one another in a variety of directions. The '949 robot may only move bidirectionally over a linear path. The '382 robot may only move bidirectionally over a linear path and rotate about a center axis. Therefore, providing a tool directly on one of the support structures of either the '949 or '382 robot offers limited ability to manipulate the tool. An apparatus is therefore needed to offer improved mobility while performing tasks on a work surface. The apparatus should be capable of performing the tasks in a precisely repeatable manner.

SUMMARY OF THE INVENTION

We provide a robot for traversing a work surface such as the surface of an aircraft. The robot is equipped with some type of tool to perform a task on the work surface. The robot further has an elongated first support structure or spine that has a longitudinal axis.

First gripping means, which are preferably a plurality of suction cups, are attached at each end of the spine to allow the spine to be selectively and detachably adhered to the work surface. Preferably, one end of the spine has a single suction cup and the opposite end of the spine has a short support beam with suction cups attached to opposite ends of the support beam.

At least one and preferably two travelling meanders are movably coupled to the spine. The travelling members and the spine are selectively capable of moving relative to one another in a direction parallel to the longitudinal axis of the spine. Preferably, the travelling members and the spine are designed as components of a light weight linear stepping motor.

A respective elongated cross bridge is movably connected to each travelling member. Portions of the cross bridge extend outward in opposite directions from each travelling member. Together, each travelling member and respective cross bridge comprise a second support means. A second gripping means is provided on each cross bridge. The preferred second gripping means is a plurality of suction cups. The second gripping means allows each cross bridge to be selectively and detachably adhered to the work surface.

The cross bridges normally extend perpendicularly outward from the spine. Thus, the robot is generally cruciform in shape. The generally cruciform shape of the robot with the relatively long spine and relatively short cross bridges extending therefrom is particularly well suited for travelling across curved surfaces having a large radius of curvature in one direction and a short radius of curvature in a perpendicular direction, such as an aircraft fuselage. The spine is preferably oriented in the direction in which the surface has a large radius of curvature, and the cross bridges are preferably oriented in the direction in which the surface has a short radius of curvature.

Means are provided for selectively moving the cross bridge and travelling member relative to one another along a line that intersects the longitudinal axis of the spine. The preferred moving means for causing the cross bridge and travelling member to move relative to one another is a power lead screw coupled to a slide. Either the lead screw or the slide is attached to the travelling member, and the other is attached to the cross bridge.

The portion of the moving means attached to the travelling member is preferably pivotably attached thereto, such as by a thrust bearing. The pivotal connection preferably may be locked into a selected position. The pivotal connection may be placed in an unlocked position that allows the cross bridges to pivot relative to the longitudinal axis of the spine so that each cross bridge and respective travelling member may move relative to one another at any selected angle from the longitudinal axis of the spine. The pivotal connection may also be placed in a locked position in which the cross bridge is secured in a fixed position relative to the longitudinal axis of the spine. The cross bridge is preferably positioned perpendicular to the longitudinal axis of the spine when the pivotal connection is locked.

Although the tool or tools may be selected to perform any function, the tool is preferably an inspection means for monitoring conditions on the work surface and below the work surface. Preferably, high frequency and low frequency eddy current probes will be employed as the inspection means.

Preferably four video cameras will be provided for alignment of the eddy current sensor with individual rivets, guidance of the eddy current sensor path along a row or sequence of rivets or other features under inspection, navigation of the robot during performance of an inspection sequence, path planning of the robot between inspection sequences, and opportunistic multi-resolution visual inspection of the work surface for flaws other than the type that will be detected by the eddy current sensors.

Guidance and positioning of the robot may be conducted remotely as a teleoperator or conducted automatically under control of a camera-based guidance system. Positional accuracy may be obtained by high precision dead reckoning over short distances between multiple landmarks on the work surface with precision sensor-based correction at these landmarks. The data acquired by the system may be used for retrospective analysis. Also, trends in a particular industry or class of work surface may be detected. The data archive may also be useful for the development of a methodology to set the time or a number of cycles until the next inspection.

Other objects and advantages of the invention will become apparent from a description of certain present preferred embodiments thereof shown in the drawings.

BRIEF DESCRIPTION OF THE DRAWINGS

FIG. 6A is a plan view partially cut away of a preferred pivotal connection in an unlocked position.

FIG. 6B is a plan view of a preferred pivotal connection in a locked position.

FIG. 11A shows a step of a second preferred sequence of movements of the robot in a direction at an angle to the longitudinal axis of the spine.

FIG. 11B shows a next step of a second preferred sequence of movements of the robot in a direction at an angle to the longitudinal axis of the spine.

FIG. 11C shows a next step of a second preferred sequence of movements of the robot in a direction at an angle to the longitudinal axis of the spine.

FIG. 11D shows a next step of a second preferred sequence of movements of the robot in a direction at an angle to the longitudinal axis of the spine.

FIG. 12A shows a step of a third preferred sequence of movements of the robot in a direction at an angle to the longitudinal axis of the spine.

FIG. 12B shows a next step of a third preferred sequence of movements of the robot in a direction at an angle to the longitudinal axis of the spine.

FIG. 12C shows a next step of a third preferred sequence of movements of the robot in a direction at an angle to the longitudinal axis of the spine.

FIG. 12D shows a next step of a third preferred sequence of movements of the robot in a direction at an angle to the longitudinal axis of the spine.

DETAILED DESCRIPTION OF THE PREFERRED EMBODIMENT

Figure 1:
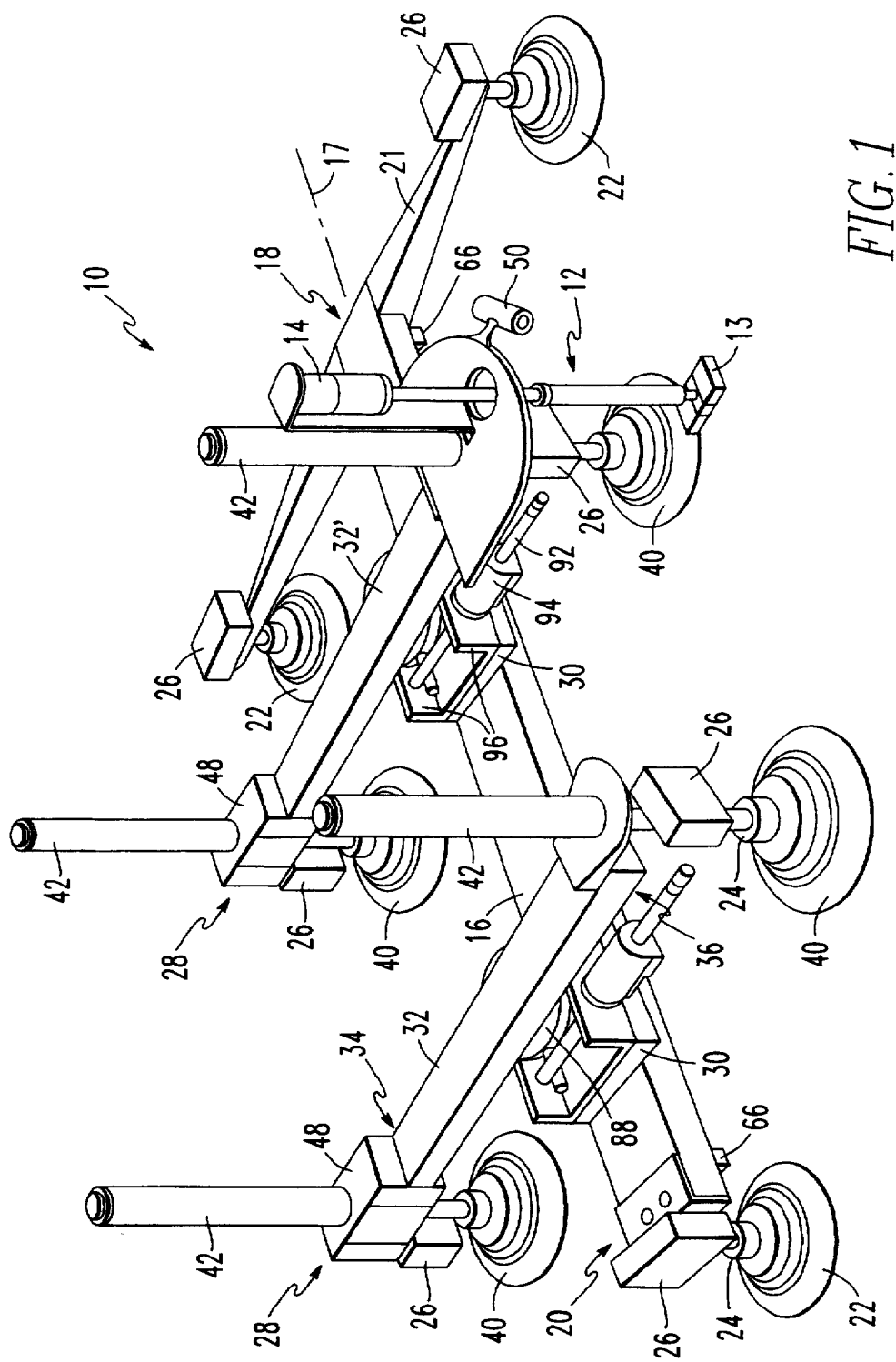
FIG. 1 is a perspective view of the present preferred robot.

A preferred robot 10 for traversing a work surface 11 such as the surface of an aircraft is shown in FIG. 1. The work surface 11 may be flat, curved or irregular. The robot 10 carries one or more of the same or different types of tools 12 to perform a task on the work surface 11. The robot 10 will preferably be generally cruciform in its configuration, having an elongated first support structure or spine 16. The spine 16 has a first end 18 and a second end 20. A longitudinal axis 17 of the spine 16 is directed along a line connecting the spine first end 18 and the spine second end 20.

Figure 4:
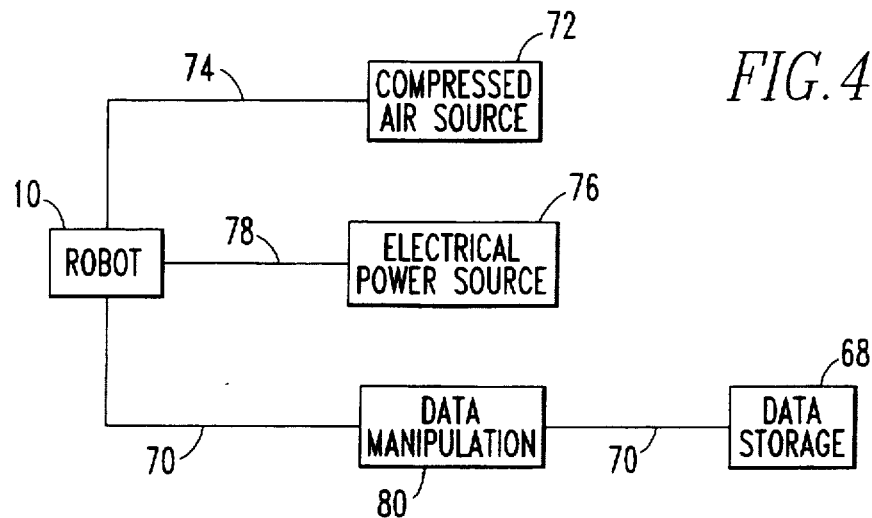
FIG. 4 is a diagrammatic representation of the preferred robot system.

First gripping means 22, which are preferably a plurality of suction cups, are attached along the spine 16, preferably at each end 18, 20. The first gripping means 22 allow the spine 16 to be selectively and detachably adhered to the work surface 11. Although suction cups are the preferred first gripping means 22, any means for detachably adhering the first support structure 16 to the work surface 11, such as a plurality of electromagnets, may be employed. The vacuum between the suction cups and the work surface may be created and maintained against leakage by pumps operated by any convenient means, such as electric motors, electromagnetic solenoids, hydraulic pistons, or preferably by pneumatic aspirating ejectors 26. As depicted in FIG. 4, a compressed air source 72 is provided to supply compressed air to the ejectors 26 through compressed air delivery lines 74.

A single suction cup may be provided at the first and second ends 18, 20 of the spine 16, or two or more suction may be attached either directly to the ends 18, 20 of the spine 16 or to a short support beam 21 affixed to an end of the spine 16. Preferably, one end of the spine has a single suction cup and the opposite end of the spine has a short support beam 21 with suction cups attached to opposite ends of the support beam 21. This three point suspension of the spine 16 on the work surface 21 offers enhanced stability on curved work surfaces such as aircraft fuselages. Depending on the length chosen for the spine 16, one or more suction cups may be provided along the length of the spine 16 between each spine end 20.

Each first gripping means 22 is preferably mounted directly on the spine 16. However, the first gripping means 22 may alternatively be mounted on respective actuators that could move the first gripping means 22 selectively toward and away from the work surface 11. Pivotal joints 24, such as ball joints, may be employed to connect the gripping means 22 to the spine 16 to allow the robot 10 to adapt to curved work surfaces 11.

At least one and preferably two travelling members 30 are movably coupled to the spine 16. The travelling members 30 and the spine 16 are selectively capable of moving relative to one another in a direction parallel to the longitudinal axis 17 of the spine 16.

The preferred means for moving the travelling members 30 and the spine 16 relative to one another is a light weight stepping motor configuration with a fine tooth pitch and fractional pitch position resolution. Linear motors are especially preferred for this task. Linear stepping motors are generally known and function according to the same electromagnetic principles as rotary stepping motors. By using linear stepping motors, linear transducers or similar means are not needed to determine the position of the travelling members 30 since the linear stepping motors are driven by electromagnetic pulses which may be counted in order to determine travelling member position.

Figure 2:
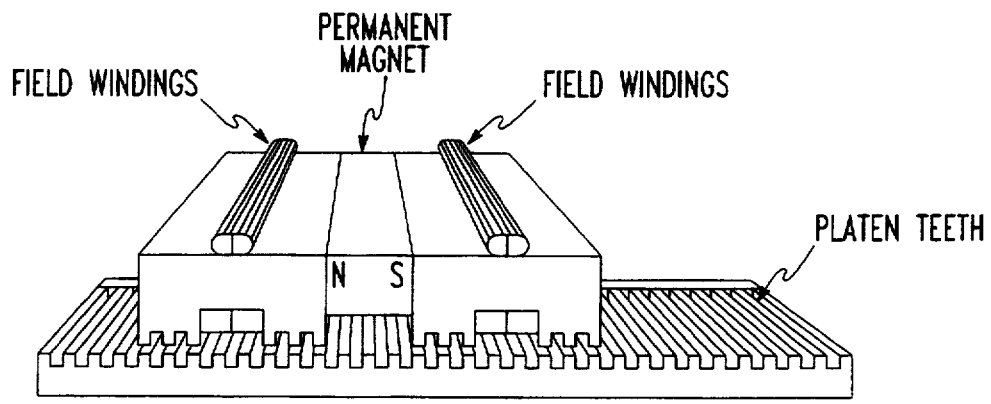
FIG. 2 is a schematic representation of a prior art linear motor.

A schematic representation of a typical linear motor configuration known in the prior art is shown in FIG. 2. A platen is provided (which is essentially a stator) that is an elongated bar of magnetic material, such as steel, having a plurality of grooves that extend on a surface of the platen over the distance to be traversed. A nonmagnetic material, such as an epoxy, is applied to the grooved surface of the platen to make the surface smooth. The platen is preferably completely passive (i.e., is not equipped with any magnets or electromagnets). All magnets and electromagnets are preferably incorporated into each forcer (which is essentially an armature). Each forcer may then be moved bidirectionally along the platen to specific and known locations in response to the state of the currents in its field windings. The preferred linear motor for use in the robot is a modified L Drive bipolar, microstepping drive manufactured by the Compumotor Division of Parker Hannifin Corporation. In the preferred robot 10, the platen is integrated into the spine 16 and the travelling members 30 are forcers electromagnetically coupled to the platen. Compressed air may be supplied to the air bearings of the linear motor from a remote compressed air source. The travelling members (forcers) 30 are preferably modified so as to be provided with rollers (not shown). The rollers, which extend into contact with the spine 16, prevent the travelling members 30 from moving in any direction except along the longitudinal axis 17 of the spine 16.

Figure 3A:
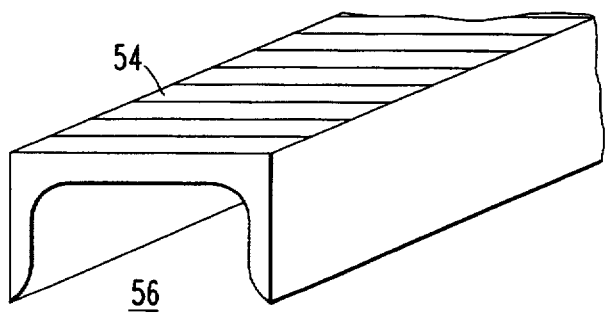
FIG. 3A is a perspective view of a portion of a first preferred spine.
Figure 3B:
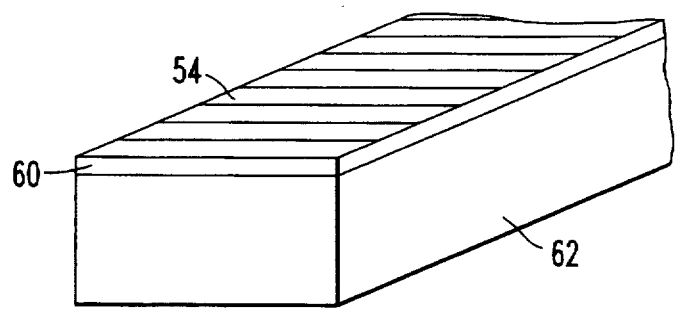
FIG. 3B is a perspective view of a portion of a second preferred spine.

For many applications, such as aircraft skin inspection, substantial benefit may be acquired by reducing the weight of the robot 10. With this consideration in mind, when the driving means is a linear motor, the platen (which, in this embodiment, is the spine 16) may be modified for weight savings. For example, referring to FIG. 3A, the platen 16 may be machined to remove material leaving a generally U-shaped member in which the material is removed leaving a cavity 56 on the underside of the platen 16 opposite the grooves 54. The platen cavity 56 may then be filled with a lightweight material or, preferably, be left hollow. An alternative method of reducing the weight of the platen 16 is depicted in FIG. 3B and involves creating a platen 16 by bonding a thin, grooved plate 60 of magnetic material onto a beam 62 of strong, lightweight material such as a magnesium extrusion.

A respective elongated cross bridge 32 is movably connected to each travelling member 30. Portions of the cross bridge 32 extend outward in opposite directions from each travelling member 30. A first end 34 of the cross bridge 32 extends out to one side of the travelling member 30 and a second end 36 of the cross bridge 32 extends out to an opposite side of the travelling member 30. Together, each travelling member 30 and respective cross bridge 32 comprise a second support structure 28.

A second gripping means 40 is provided on each cross bridge 32. The preferred second gripping means 40 is a plurality of suction cups. The vacuum between the suction cups and the work surface may be created and maintained against leakage by pumps operated by an convenient means, such as electric motors, electromagnetic solenoids, hydraulic pistons, or preferably by pneumatic aspirating ejectors 26. Each of the second gripping means 40 are preferably equipped with ejectors 26 similar to those of the first gripping means 22 for creating a vacuum between the suction cups and the work surface 11. The ejectors 26 of the second gripping means 40 may be supplied compressed air through delivery lines 74 from the same compressed air source 72 as supplies the ejectors 26 of the first gripping means 22. A single suction cup may be provided at each end 34, 36 of the cross bridge 32, any number of or suction cups may be provided at any selected locations along the length of the cross bridge 32. Each second gripping means 40 allows each cross bridge 32 to be selectively and detachably adhered to the work surface 11.

Although suction cups are the preferred second gripping means 40, any means for detachably adhering the second support structure to the work surface 11, such as electromagnets, may be employed. Each second gripping means 40 is preferably mounted on an actuator 42. Each actuator 42 may be powered by any convenient means but are preferably pneumatic, allowing the second gripping means 40 to be selectively moved toward and away from the work surface 11. Compressed air may be delivered to each actuator 42 from the same compressed air source 72 as is provided to the ejectors 26 for the first and second gripping means 22, 40. The compressed air is preferably fed to the ejectors 26 and to the actuators 42 by flexible, umbilical-like air delivery cables 74. By operation of the actuators 42, the robot is selectively supported upon the work surface 11 either by the first gripping means 22 or by the second gripping means 40. Pivotal ball joints 24 may be employed to connect the second gripping means 40 to respective actuators 42 to allow the robot 10 to adapt to curved work surfaces 11.

Figure 5:
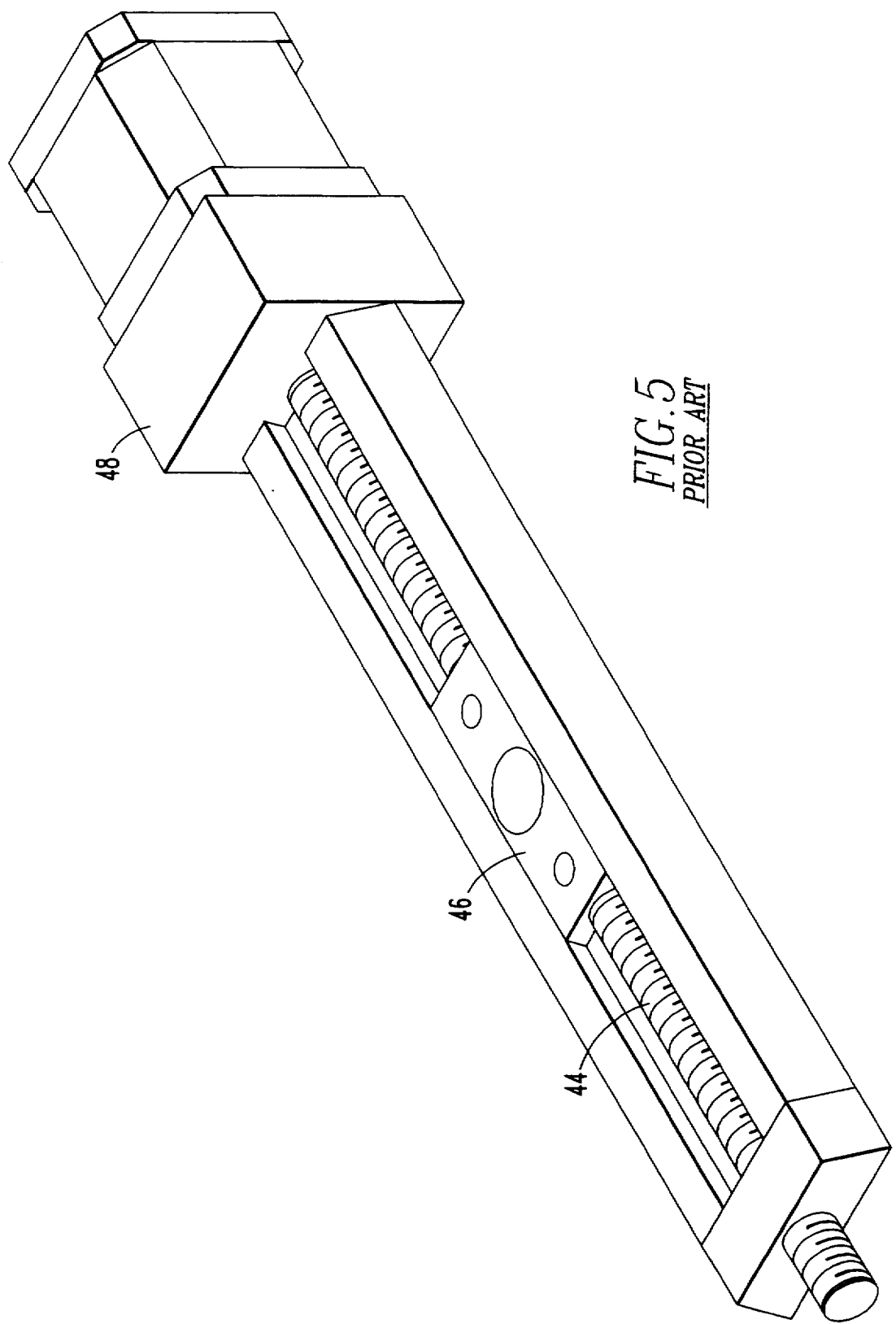
FIG. 5 is a perspective view partially cut away of an end screw system.

Means are provided for selectively moving the cross bridge 32 and travelling member 30 relative to one another in a direction of a line that intersects the longitudinal axis 17. The preferred moving means for moving the cross bridge 32 and travelling member 30 relative to one another is a power lead screw system shown in FIG. 5 consisting of a lead screw 44 coupled to a slide 46. Either the lead screw 44 or the slide 46 is attached to the travelling member 3C, and the other of the lead screw 44 and slide 46 is attached to the cross bridge 32. The lead screw 44 may be powered by a small motor 48. Alternatively, a solenoid, an air cylinder, a linear motor, a conventional motor or any convenient means may be employed to move cross bridge 32 and travelling member 30 relative to each other.

Regardless of what type of moving means is attached to the cross bridge 32 and travelling member 30, the cross bridge 32 and the travelling member 30 are preferably pivotably connected by a pivotal connection 88. Referring to FIGS. 6A and 6B, a preferred pivotal connection 88 is shown. In the unlocked position, shown in FIG. 6A, the pivotal connection 88 allows the cross bridges 32 to be oriented and moved at any angle relative to the longitudinal axis 17 of the spine 16. Thus, each cross bridge 32 and respective travelling member 30 may move relative to one another along a line that intersects the longitudinal axis 17 of the spine 16. The pivotal connection 88 may be locked into a particular position as shown in FIG. 6B. Normally, the locked position of the pivotal connection 88 is such that the cross bridge 32 extends out from the travelling member 30 in a direction perpendicular to the longitudinal axis 17 of the spine 16. The pivotal connection 88 may be a bearing such as a thrust bearing and preferably has a stem 90 extending therefrom. The stem 90 extends between two clamping surfaces 96, 97 that are connected to a rod 91 that may be extended and retracted along a linear path. The rod 91 may be extended and retracted along a linear path by any convenient means such as a lead screw, a solenoid, or as is preferred, an air cylinder 92. The cylinder 92 is preferably disposed within an air bearing 94. The cylinder 92 is allowed to move bidirectionally along a linear path by the air bearing 94. Although an air bearing is preferred, any type of sleeve, bearing or other means for allowing bidirectional movement of the cylinder 92 may be used. As shown in FIG. 6A, the rod 91 may be extended from cylinder 92 so that clamping surfaces 96, 97 are not in contact with and are separated by some distance from the stem 90 of the pivotal connection 88. In this unlocked position, the pivotal connection 88 and the stem 90 attached thereto may pivot freely without the stem 90 being hindered by contact with the clamping surfaces 96, 97.

The rod 91 may be retracted within cylinder 92, as shown in FIG. 6B, to lock the pivotal connection 88. The clamping surface 96 lying between the cylinder 92 and the stem 90 may preferably slide along the rod 91. Clamping surface 97, that is located on an end of rod 91 most distant to the cylinder 92, is preferably fixed to the rod 91 so as to prevent clamping surface 97 from sliding along the rod 91. A stopper 98 is rigidly fixed to the travelling member 30. The stopper 98 is sized and positioned so that as the rod 91 is drawn into the cylinder, clamping surface 97 will eventually contact stopper 98. Cylinder 92 continues to exert a retracting force on the rod 91. And once clamping surface 97 contacts the stopper 98, rod 91 no longer moves and the cylinder 92 is moved through air bearing 91 by the retracting force it exerts on the rod 91, towards stopper 98. Cylinder 92 pushes clamping surface 96 along with it as cylinder 92 moves toward stopper 98. Cylinder 92 will continue to push clamping surface 96 towards stopper 98 until clamping surface 96 contacts stopper 98. Clamping surfaces 96, 97 will push the stem 90 along with them if clamping surfaces 96, 97 come into contact with the stem 90 as the clamping surfaces 96, 97 are brought into contact with the stopper 98. Thus, once clamping surfaces 96, 97 are brought into contact with stopper 98, the stem 90 is securely held by clamping surfaces 96, 97 and is positioned even with the stopper 98. Therefore, stopper 98 is preferably located on the travelling member 30 such that when the stem 90 is locked, the stem 90 extends parallel to the longitudinal 17 axis of the spine 16. And since the stem is preferably mounted on the pivotal connection 88 perpendicularly to the cross bridge 32, the cross bridge 32 is oriented perpendicularly to the longitudinal axis 17 of the spine 16 when the pivotal connection 88 is in the locked position.

To minimize the number of moving components, the tool 12 is preferably incorporated in the cross bridge 32. A single tool 12 may be provided on one cross bridge 32, or any or all of the cross bridges 32 may have one or more tools thereon. The cross bridges 32 carry the tools and also provide the robot's ability to traverse the work surface 11. Thus, the second gripping means 40 attached to a cross bridge 32 and a tool or tools 12 attached to the same cross bridge 32 are moved together when the robot 10 travels along the work surface 11. However, it is further preferred that the tool 12 may be actuated (i.e., moved toward and away from the work surface 11) independently of the second gripping means 40 by an actuator 14. The tool actuator 14 is preferably operated by compressed air gripped to actuators 42 and connected by air lines 74 to the compressed air source 72. Compressed air is needed to operate pneumatic actuators 14, 42 that power the up and down motion of the tool and gripping means 22, 40, as well as the ejectors 26 that create the vacuum under the suction cups. System compressed air consumption for each of these functions is preferably comparable to the consumption of a single air operated hand tool of the type commonly used by mechanics.

Although the tool or tools 12 may be selected to perform any function, the tool 12 is preferably an inspection means for monitoring conditions on the work surface 11 and below the work surface 11. Preferably, high frequency and low frequency eddy current probes will be employed as the inspection means. The probes which are preferably eddy current probes each employ a transmitting and a receiving coil. The transmitting and receiving coils may be separate coils or may be embodied in a single coil depending on the inspection requirements. The transmitting coil and receiving coil are coupled electromagnetically through the metal under inspection. Anomalies in the impedance that characterizes the coupling indicate cracks, corrosion thinning, and other flaws.

When an impedance reading is classified as abnormal, an alarm is signaled. Simple abnormalities may be recognized by the impedance readings falling outside of a preset range. More complex abnormalities may be recognized by "pattern recognition" or "signal analysis" algorithms that take into account features of the shape of the impedance versus sensor position curve observed as the sensor is scanned over the area under inspection. An alarm mechanism may be provided to alert a human operator and/or mark the area of the work surface 11 that triggered the alarm. Preferred marking means include a grease pencil or washable paint dab, but may be any other nonpermanent but noticeable marking means.

Figure 7A:
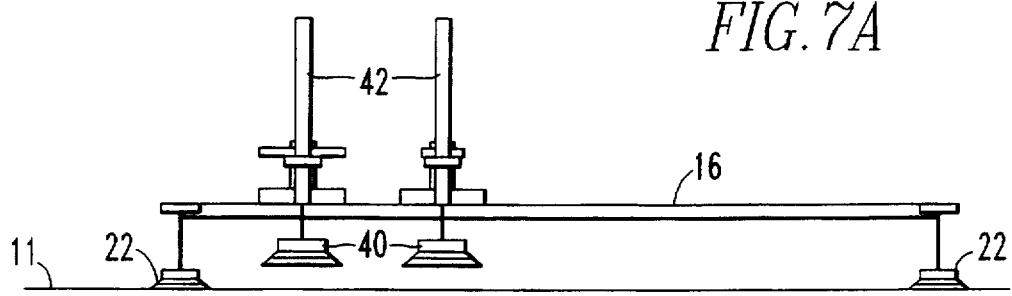
FIG. 7A is a side elevational view of the robot with first gripping means affixed to the work surface.
Figure 7B:
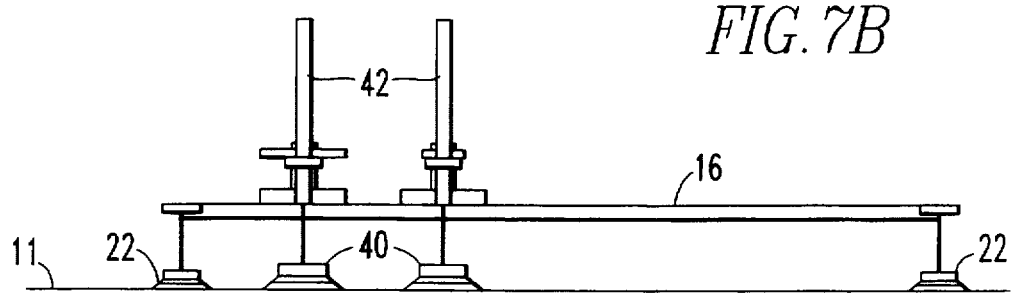
FIG. 7B is a side elevational view of the robot with first and second gripping means affixed to the work surface.
Figure 7C:
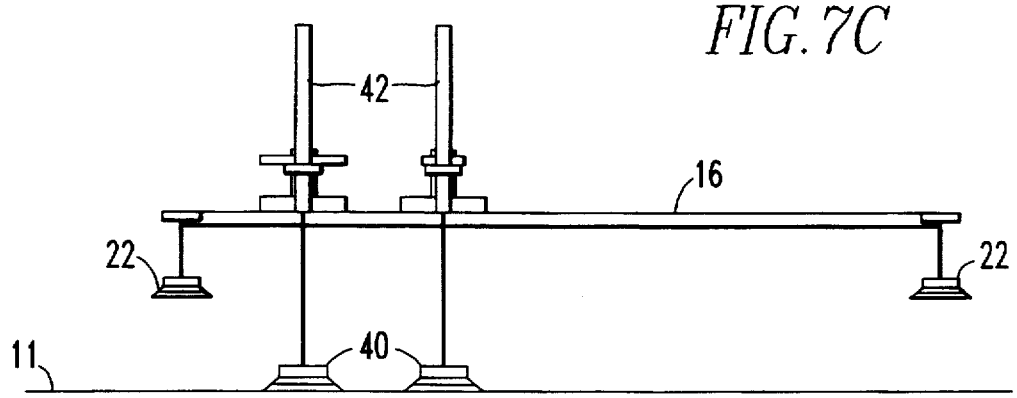
FIG. 7C is a side elevational view of the robot with second gripping means affixed to the work surface.

One of or both of the first and second support structures may be selectively affixed to the work surface as shown in FIGS. 7A, 7B and 7C. Referring first to FIG. 7A, actuators 42 fully retract the second gripping means 40 away from the work surface so that the first gripping means are left in contact with the work surface 11. Then, the first gripping means 22 are locked onto the work surface 11. Referring next to FIG. 7B, the second gripping means 40 are then moved towards the work surface 11 by the extension of actuators 42. As seen in FIG. 7B, the second gripping means 40 will eventually contact the work surface 11 and will be affixed thereto (it is preferred that at least one gripping means is always adhered to the work surface at any given time, therefore the sequence is to adhere one gripping means before releasing the other gripping means). Once the second gripping means 40 have been affixed to the work surface 11, the first gripping means 22 are released. The continued extension of actuators 42, shown in FIG. 7C, causes the first gripping means to be moved away from the work surface 11.

To walk, the second gripping means 40 are extended from the cross bridges 32 by their actuators 42 into contact with the work surface 11, as shown in FIG. 7B. The second gripping means 40 are then gripped or adhered to the work surface 11. The sensor head 13 is preferably only in contact with the work surface 11 during the inspection function, therefore, the sensor head 13 is preferably retracted away from the work surface 11 at this time by actuator 14 so as to reduce wear and/or damage to the sensor head 13 through contact with the work surface 11 due to contact between the sensor and work surface. The first gripping means 22 are then detached from the work surface 11 and are moved away from the work surface 11 by the continued extension of actuators 42, as shown in FIG. 7C. With the first gripping means 22 released, the spine 16 is not in direct contact with the work surface 11 and may be moved relative to the work surface 11. And with the second gripping means 40 adhered to the work surface 11, each cross bridge 32 is in direct contact with the work surface 11 and may not be moved relative to the work surface 11. Therefore, driving the linear motor in a backward direction forces the spine 16 to move relative to the cross bridges 32 in an opposite (forward) direction. The terms "forward" and "backward" are used to describe two opposite directions parallel to the longitudinal axis 17 of the spine.

Figure 8A:
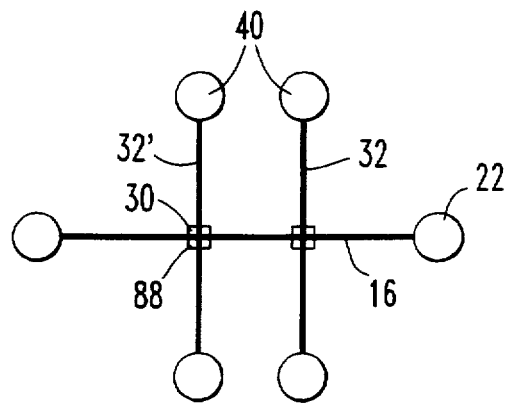
FIG. 8A shows a first step of movement of the robot in a direction parallel to the longitudinal axis of the spine.
Figure 8B:
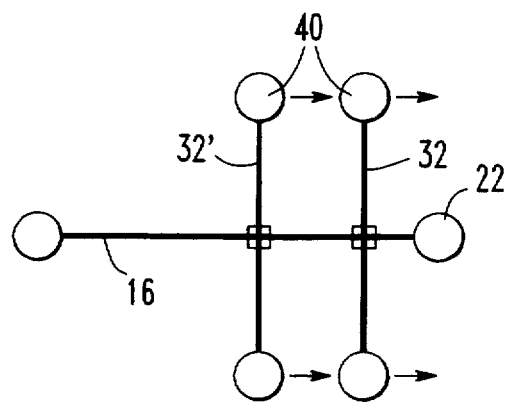
FIG. 8B shows a next step of movement of the robot in a direction parallel to the longitudinal axis of the spine.
Figure 8C:
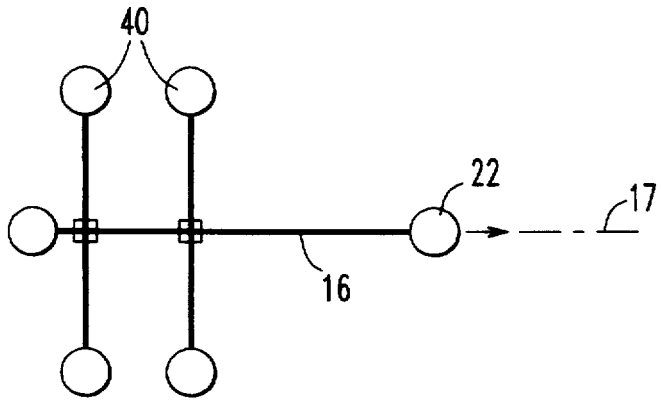
FIG. 8C shows a next step of movement of the robot in a direction parallel to the longitudinal axis of the spine.

When the spine 16 travels as far in the forward direction as is possible, the first gripping means 22 of the spine 16 are brought toward the work surface 11 by the retraction of actuators 42 and adhered to the work surface 11. The second gripping means 40 are released from the work surface 11 and are moved away from the work surface 11 by the continued retraction of actuators 42. The cross bridges 32 are then driven by the action of the linear motor, by respective travelling members 30, in the forward direction. The movement of the robot in a direction parallel to the longitudinal axis 17 of the spine is represented in FIGS. 8A through 8C. From an initial position shown in FIG. 8A, the first cross bridge 32 and the second cross bridge 32' are driven in the forward direction (shown as arrows) in FIG. 8B. After the second gripping means 40 are driven as far as possible in the forward direction, the first gripping means 22 are released from the work surface and the second gripping means 40 are adhered to the work surface, the linear motor is reversed and the spine 16 is driven in the forward direction as shown in FIG. 8C. It is understood that the direction of the motors could be reversed in the above description so that the robot would move in the backward direction.

A similar sequence is used to traverse in a direction perpendicular to the longitudinal axis 17 of the spine 16. However, the cross bridges 32 and travelling members 30 are driven perpendicular to the longitudinal axis 17 of the spine 16 by the lead screws 44.

Figure 9A:
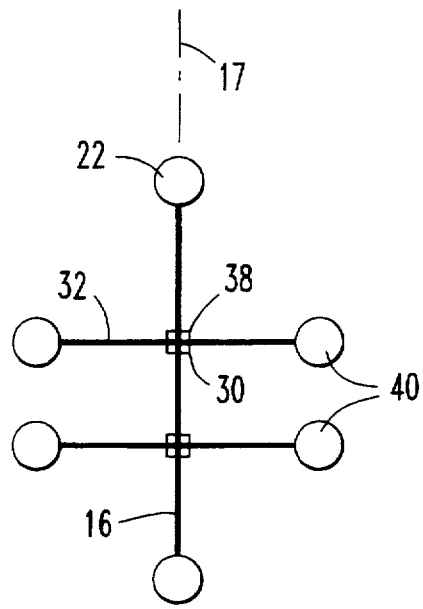
FIG. 9A shows a step of movement of the robot in a direction perpendicular to the longitudinal axis of the spine.
Figure 9B:
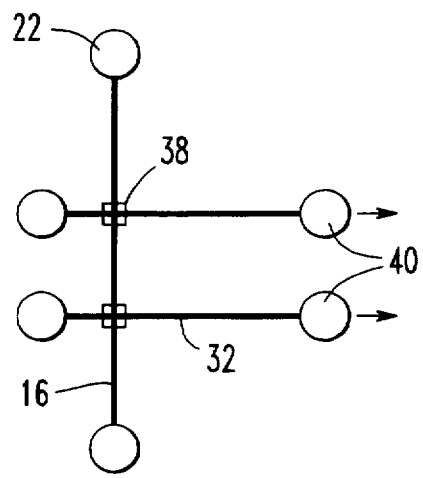
FIG. 9B shows a next step of movement of the robot in a direction perpendicular to the longitudinal axis of the spine.
Figure 9C:
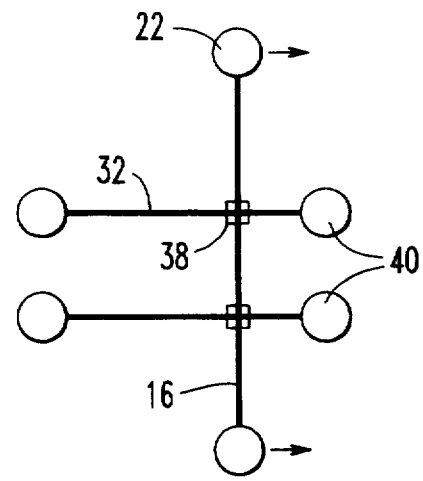
FIG. 9C shows a next step of movement of the robot in a direction perpendicular to the longitudinal axis of the spine.

As shown in the sequence of FIGS. 9A through 9C, the pivotal connections of the cross bridges may be locked in a position perpendicular to the longitudinal axis 17 of the spine 16 in an initial position shown in FIG. 9A. The cross bridges are then moved in the direction perpendicular to the spine's longitudinal axis 17 as shown in FIG. 9B. After adhering and releasing the second and first gripping means, respectively, the spine is then driven in the direction perpendicular to the spine's longitudinal axis 17 as shown in FIG. 9C.

Figure 10A:
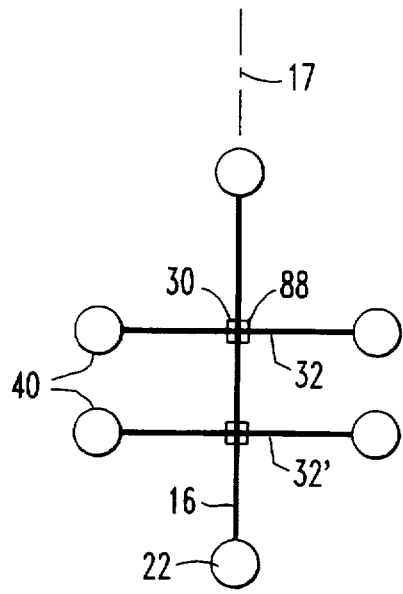
FIG. 10A shows a step of the preferred sequence of movements of the robot in a direction at an angle to the longitudinal axis of the spine.
Figure 10B:
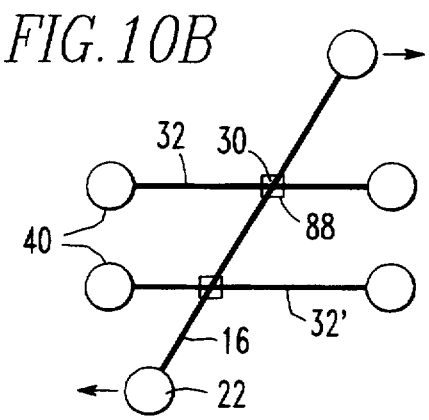
FIG. 10B shows a next step of the preferred sequence of movements of the robot in a direction at an angle to the longitudinal axis of the spine.
Figure 10C:
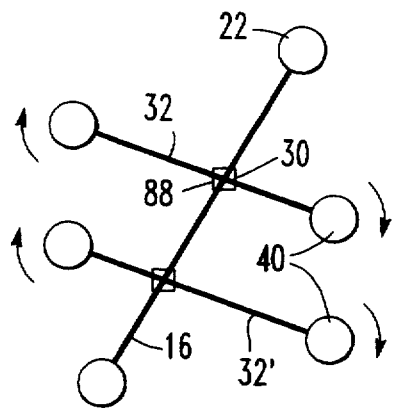
FIG. 10C shows a next step of the preferred sequence of movements of the robot in a direction at an angle to the longitudinal axis of the spine.
Figure 10D:
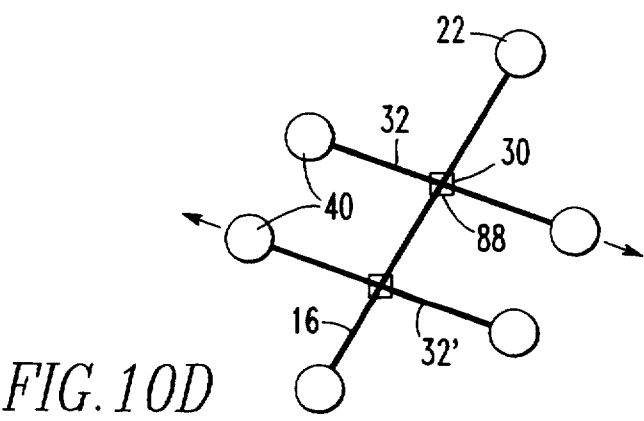
FIG. 10D shows a next step of the preferred sequence of movements of the robot in a direction at an angle to the longitudinal axis of the spine.

The robot 10 may be moved at an angle to the spine's longitudinal axis 17 such as to align itself to a line of landmarks, as shown in FIGS. 10A through 10D. Throughout this movement sequence, the travelling members 30 are prevented from moving relative to the spine 16. Referring first to FIG. 10A, the second gripping means 40 are affixed to the work surface 11, the first gripping means 22 are released from the work surface 11, and the pivot connections 88 are in an unlocked position. The lead screw and slider then cooperate to drive the travelling members 30 relative to the cross bridges 32, 32' in respective opposite directions indicated by the arrows as shown in FIG. 10B. The travelling members 30 thereby move the spine 16 relative to the cross bridges 32, 32'. It is preferred that the spine 16 is moved in opposite directions relative to each of the two cross bridges 32, 32', as indicated by the arrows in FIG. 10B. The first gripping means 22 are then affixed to the work surface 11 and the second gripping means 40 are released from the work surface 11. The pivot connections 88 are then brought to the locked position as shown in FIG. 10C. Then, as shown in FIG. 10D, the cross bridges 32, 32' may be driven relative to the travelling members 30 as indicated by the arrows of FIG. 10D.

The robot 10 may be moved in a direction that is at an angle to the spine's longitudinal axis 17 in a second preferred manner, as shown in FIGS. 11A through 11D. In this movement sequence, the travelling members 30 will be moved relative to the spine 16. The pivot connections 88 are first locked in a position so that the cross bridges 32 are perpendicular to the spine's longitudinal axis 17 as shown in the initial position of FIG. 11A. Then, a first cross bridge 32 is driven a selected distance in one direction and a second cross bridge 32' is either not driven or it is driven a selected distance in an opposite direction as the first cross bridge 32 is driven as shown in FIG. 11B. The pivotal connections for the first and second cross bridges 32, 32' are released to allow the cross bridges 32, 32' to freely rotate about the travelling members. Then, as shown in FIG. 11C, the travelling members 30 are driven relative to the cross bridges by the lead screw and slide, moving the spine along with them. The movement of the travelling members relative to the cross bridges 32, 32' causes the spine 16 to be moved angularly relative to the cross bridges, and causes the pivotal connections at the cross bridges 32, 32' to pivot. At this point, the travelling members 30 will be moved relative to the spine 16 to allow the spine to pivot relative to the cross bridges. The cross bridges 32, 32' may then be brought into a position perpendicular to the spine's longitudinal axis 17 as shown in FIG. 11D. In this manner, the robot 10 may effectively rotate or move along a curvilinear path.

Although the above description of the robot movement shown in FIGS. 11A through 11D at an angle to the longitudinal axis 17 has been provided in terms of the cross bridge 32 being moved, it is understood that in the same way the second gripping means 40 may be adhered to the work surface 11 and the lead screws may then drive the travelling members 30 into movement relative to the work surface 11.

The preferred pivotal connection 88 are passive in their operation. That is, the pivotal connections 88 are not able to drive themselves in rotation but rather are either "unlocked" in which they may pivot freely subject to external forces, or "locked" in which they are prevented from pivoting freely. The locking action of the pivotal connections 88 preferably returns the cross bridge to a selected position (which is preferably perpendicular to the spine 16. As an alternative, the pivotal connections 88 may be provided with moving means for driving the pivotal connection 88 to selected pivot positions. When the pivotal connections are equipped with such moving means, the robot may be moved angularly as shown in FIGS. 12A through 12D. First, the pivotal connections may be locked in a position that is some angle other than perpendicular to the spine's longitudinal axis 17, as shown in FIG. 12B. The cross bridges and spine are then moved relative to one another by the lead screw system in a sequence similar to the sequence shown in FIGS. 9A through 9C. The pivotal connections 88 may orient each cross bridge to a selected angle. Each cross bridge 32 is then driven relative to the travelling members 30 along that angle. Because the travelling members 30 may only move parallel to the spine's longitudinal axis 17, any movement of the cross bridges 32 at an angle to the longitudinal axis 17 will be movement relative to the spine 16 as well as the travelling members 30.

Figure 13A:
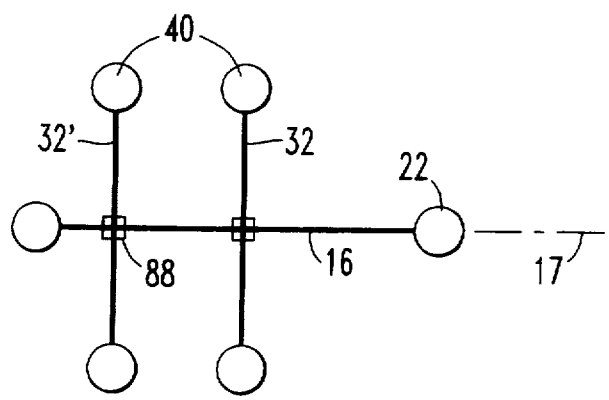
FIG. 13A shows a step of movement of the robot while performing a scan.
Figure 13B:
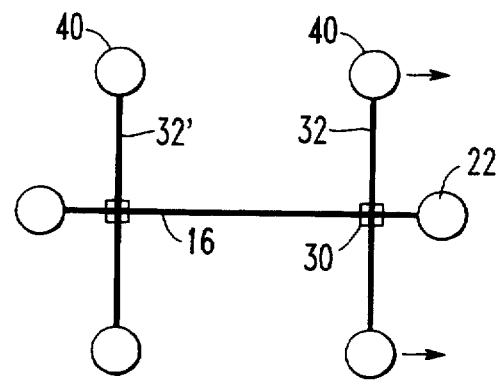
FIG. 13B shows a next step of movement of the robot while performing a scan.
Figure 13C:
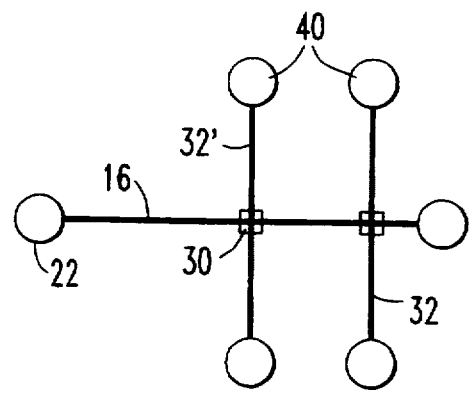
FIG. 13C shows a next step of movement of the robot while performing a scan.

An operation of the tool is described herein for the case in which the tool is an inspection sensor. The following description of the inspection operation is provided as an example, it being understood that the operation of the robot tool will depend on the particular tool being deployed by the robot. To perform a sensor scan, at least one of the cross bridges 32 are driven by the travelling member 30 independently along the spine 16, driving second gripping means 40 and the sensor tool 12 (which is preferably mounted on the second support structure adjacent the second gripping means 40). The sensor head 13 is thus carried over the word surface 11. An additional cross bridge 32 can be locked to the work surface 11 for additional stability, or an additional cross bridge 32 may deploy an additional tool 12. Preferably, two cross bridges 32 are employed on the robot, one having a tool 12 thereon and the other providing additional stability. As is shown in the sequential FIGS. 13A through 13C, with the first gripping means 22 adhered and the second gripping means 40 released, it is preferred that the two cross bridges are driven in a staggered fashion. The cross bridges are driven in a staggered fashion during tool operation so that the nonmoving bridge may provided additional stability. Thus, from an initial position shown in FIG. 13A, the first cross bridge 32 is driven in the forward direction (shown as arrows) in FIG. 13B. Referring next to FIG. 13C, the second cross bridge 32' is then driven in the forward direction (designated as arrows). It is understood that a tool 12 may be provided on one of or both of the cross bridges 32, 32'. It is further understood that both cross bridges may be indexed forward simultaneously rather than in a staggered fashion, particularly when a tool is provided on both cross bridges.

The linear stepper motors are preferably driven by a 20 kHz oscillator. This oscillator may potentially provide a source of interference with the eddy current sensors when the sensors are employed as the tool 12. Therefore, the sensor circuitry should be provided with a sufficiently narrow bandwidth so that no detectable interference will be attained so long as the sensor operating frequency differs from the oscillator frequency by a few tenths of a kHz. For operating the robot, electrical power is needed and is supplied by an onboard or remote power source 76, depicted in FIG. 4 and delivered in power lines 78. Thus, separate lines may be provided for the electrical power, compressed air and data.

Sensors may also assist in the guidance of the robot 10. Positional accuracy may be obtained by high precision dead reckoning over short distances between pairs of landmarks. The preferred landmarks when the work surface is an aircraft skin, for example, are the surface rivets and skin joints, each of which is individually identifiable in the aircraft design database of the surface layout. Thus, fine positioning of the robot 10 and the tool 12 may be accomplished using a second sensor or set of sensors 66 to locate the rivets. Most aircraft skin panels are cylindrical fuselage surfaces with "horizontal" and "vertical" rows of rivets. The term "horizontal" is used as meaning approximately parallel to the long axis 17 of the airplane from nose to tail. The term "vertical" is used as meaning approximately circumferential around the fuselage. Small corrections in the guidance of the robot 10 may then be made using the eddy current signals themselves. The eddy current signals may be used to indicate the departure of the actual scan line from an ideal scan line relative to the known position of each rivet.

A system of cameras may also be employed to assist with corrections as well as inspection and guidance of the robot. A first camera 50 is preferably provided on the cross bridge 32 adjacent to the tool 12 for close-up inspection with a narrow field of view of the area of the work surface 11 on which the task will be performed. Second and third cameras (66) may be provided on opposite ends of the spine for alignment of the robot with visual landmarks on the work surface 11, such as lines of rivets or skin joints. A fourth camera (not shown) may further be provided on a location of the robot most distant from the work surface 11 so as to be capable of pan and tilt with a wide field of view. The cameras may provide opportunistic multi-resolution visual inspection of the work surface 11 for flaws other than the type which will be detected by the eddy current sensors. The video signals provided by the cameras may also be used for guidance of the robot and to assure collision avoidance.

When the tool 12 is an inspection tool, such as an eddy current sensor, the data acquired by the sensors may be stored in an onboard or remote database 68, as depicted in FIG. 4. Lines 70 carry the data signals to the database 68. The data may be used for retrospective analysis such as determining the location and growth rate of defects, cracks and corrosion in an individual work surface 11 or in a group of work surfaces 11. Also, trends in a particular industry or class of work surface may be detected. The data archive may also be useful for the development of a methodology to set the time or a number of cycles until the next inspection.

Figure 14:
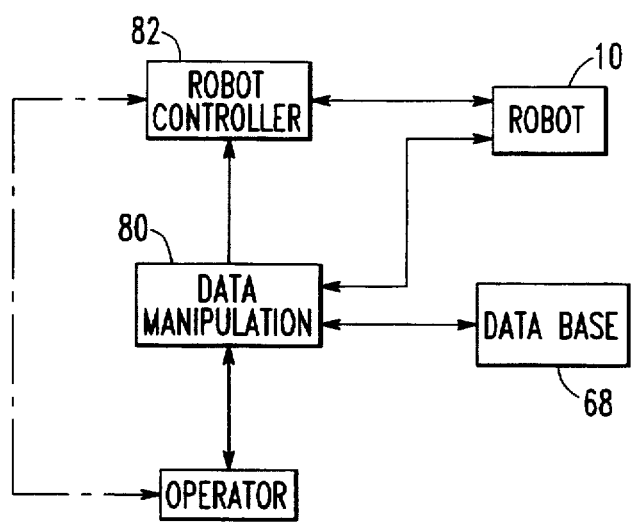
FIG. 14 is a block diagrammatic of the robot control and data systems.

Referring next to FIG. 14, the robot 10 operates in the following preferred manner. A robot controller 82 is provided which selectively activates and deactivates the various systems of the robot based upon control signals received at the controller 82. For example, the controller 82 controls the actuation of the sensors (lifting, lowering and scanning), the electrical current to the linear motor windings and the lead screw motors, as well as the valves providing air flow to the actuators, ejectors and air cylinders. A feature-based coordinate system (an annotated map of the work surface) is installed in a database 68. Data from the database 68 is input to data manipulation means 80. The data manipulation means 80 is comprised mainly of a microprocessor cooperating with an interface to the robot controller 82. The data manipulation means 80 accepts the digital data from the data base 68 and executes a series of algorithms to calculate the appropriate walking and sensor deployment movements that should be conducted by the robot 10 based on the combined data from the data base, the nominal state or pose of the robot, and the actual state or pose of the robot deduced from sensor data gathered from the robot 10. Although the data base 68 and data manipulation means 80 may be connected in any fashion, it is preferred that they be connected by a computer network that may or may not be remote.

The data are then directed from the data manipulation means 80 as a series of control signals input to the robot controller 82. Thus, the robot 10 may be guided automatically by the processed input from the database 68, with operator interaction and intervention possible. Alternatively, as depicted by the dotted line of FIG. 14, the robot controller 82 may control the robot 10 through directions provided by a remote operator (teleoperator).

The operator initially registers the robot 10 on the work surface at a predefined seam, intersection or other notable landmark. The robot 10 scans the length of the work surface using augmented dead reckoning. That is, the map of the work surface is used to plan the path of travel of the robot 10, but precise location of the surface landmarks is detected by onboard secondary sensors (preferably cameras) so that fine manipulation of the robot guidance is controlled via a closed loop involving observation of and alignment with known variables. This method compensates for both guidance sensor errors and small discrepancies between the map of the work surface and as-built dimensions.

A reduced form of the inspection data is stored in the database 68, organized in relation to the work surface map coordinates. The robot 10 then advances by walking along the work surface 11 to the next portion to be inspected. The robot 10 scans the next area of the work surface 11 and repeats the process.

While certain present preferred embodiments have been shown and described, it is distinctly understood that the invention is not limited thereto but may be otherwise embodied within the scope of the following claims.

We claim:

1. A movable robot capable of performing tasks upon and traversing a work surface, the robot comprising:
 (a) a first support means having a longitudinal axis, the first support means further having first gripping means extending therefrom for detachably adhering the first support means to the work surface;
 (b) at least one second support means being movably coupled to the first support means, each at least one second support means having respective second gripping means extending therefrom for detachably adhering the second support means to the work surface, wherein the first gripping means and the second gripping means are capable of moving relative to one another by a robot movement means in a direction parallel to the longitudinal axis and along a line that intersects the longitudinal axis, and wherein at least one of said first gripping means and said second gripping means is movable bidirectionally toward and away from the work surface by a gripping actuator means;

(c) means for moving the first gripping means and second gripping means relative to one another; and (d) at least one tool for performing a selected task on the work surface, the at least one tool being connected to at least one of the first and second support means and being movable by a tool actuator means bidirectionally toward and away from the work surface;

wherein said tool may be manipulated in three dimensions relative to the work surface solely by the tool actuator means and the robot movement means.

2. The robot of claim 1 further comprising:

(e) a data base containing a feature-based map of the work surface wherein particular features are assigned to particular coordinates in the data base;

(f) data manipulation means for converting digital data received from the data base into a selected series of control signals; and (g) a controller for receiving the control signals from the data manipulation means and effectuating at least one of robot movement and tool operation based upon the control signals received from the manipulation means.

3. The robot of claim 2 wherein the manipulation means is comprised of a microprocessor and a controller interface.

4. The robot of claim 1 wherein the at least one tool is an inspection tool.

5. The robot of claim 4 wherein the at least one inspection tool is at least one of an eddy current probe, an X-ray probe, an ultrasonic probe and a magneto-optic probe.

6. The robot of claim 4 wherein information acquired by the inspection tool is stored in a data base containing a feature-based map of the work surface, and wherein the information is stored in a location of the data base corresponding to the location of the robot on the work surface.

7. The robot of claim 1 wherein the first and second gripping means are each a plurality of suction cups.

8. The robot of claim 1 wherein the first support structure is a single elongated spine, and wherein first gripping means are disposed on opposite ends of the spine.

9. The robot of claim 8 wherein each at least one second support structure comprises:

(a) a traveling member movably coupled to the first support structure; and (b) an elongated cross bridge extending out from the travelling member in opposite directions, wherein the second gripping means is disposed on opposite ends of the cross bridge.

10. The robot of claim 9 wherein each second support structure further comprising a pivotal connection connecting each travelling member and cross bridge, the pivotal connection selectively allowing each travelling member and cross bridge to pivot relative to one another.

11. The robot of claim 9 wherein the means for moving the first gripping means and second gripping means relative to one another and parallel to the longitudinal axis is a linear motor, wherein the spine is a platen, and wherein each traveling member is a forcer electromagnetically coupled to the platen.

12. The robot of claim 9 wherein the means for moving the first gripping means and second gripping means relative to one another and at some angle from parallel to the longitudinal axis is a powered lead screw coupled to a slide, wherein one of the lead screw and the slide is attached to the travelling member, and the other of the lead screw and the slide is attached to the cross bridge.

13. A movable robot capable of performing tasks upon and traversing a work surface, the robot comprising:

(a) an elongated spine having a longitudinal axis, the spine further having first gripping means extending therefrom for detachably adhering the spine to the work surface;

(b) a plurality of elongated cross bridges being movably coupled to the spine, each cross bridge having second gripping means extending therefrom for detachably adhering the cross bridges to the work surface; and (c) means for moving the spine and cross bridges relative to one another; and (d) at least one tool for performing a selected task on the work surface, the at least one tool being attached to at least one of the spine and a cross bridge and being movable by a tool actuator means bidirectionally toward and away from the work surface;

wherein said tool may be manipulated in three dimensions relative to the work surface solely by the tool actuator means and the means for moving the spine and cross bridges relative to one another.

14. The robot of claim 13 further comprising a plurality of travelling members, wherein each cross bridge is pivotably connected to a respective travelling member, and wherein each travelling member may be moved in a direction parallel to the longitudinal axis of the spine.

15. The robot of claim 14 wherein each cross bridge and connected travelling member may be driven relative to one another along a line that intersects the longitudinal axis of the spine by at least one of a lead screw, a solenoid, an air cylinder, and a motor, and wherein the movement of the cross bridges and travelling members relative to one another causes the cross bridges and spine to move relative to one another.

16. A movable robot capable of performing tasks upon and traversing a work surface, the robot comprising:

(a) a first support means having a longitudinal axis, the first support means further having first gripping means extending therefrom for detachably adhering the first support means to the work surface; wherein the first support structure is a single elongated spine, and wherein the first gripping means are disposed on opposite ends of the spine;

(b) at least one second support means being movably coupled to the first support means, each at least one second support means having respective second gripping means extending therefrom for detachably adhering the second support means to the work surface, wherein the first gripping means and the second gripping means are capable of moving relative to one another in a direction parallel to the longitudinal axis and along a line that intersects the longitudinal axis, wherein each at least one second support structure comprises:

(i) a travelling member movably coupled to the first support structure;

(ii) an elongated cross bridge extending out from the travelling member in opposite directions, wherein the second gripping means is disposed on opposite ends of the cross bridge; and (iii) a pivotal connection connecting each travelling member and cross bridge, the pivotal connection selectively allowing each travelling member and cross bridge to pivot relative to one another wherein the pivotal connection has a stem extending radially outward therefrom, and wherein the pivotal connection is placed in a locked position when the stem is securely held by a clamping means, and wherein the pivotal connection is placed in an unlocked position when the stem is released by the clamping means;

(c) means for moving the first gripping means and second gripping means relative to one another; and (d) at least one tool for performing a selected task on the work surface, the at least one tool being attached to at least one of the first and second support means.

17. The robot of claim 16 wherein the clamping means is comprised of a rod having two clamping surfaces provided thereon, wherein the rod is connected to a means for extending and retracting the rod along a linear path, and wherein the clamping surfaces secure the stem of the pivotal connection when the rod is retracted and release the stem when the rod is extended.

18. The robot of claim 16 wherein the means for extending and retracting the rod along a linear path is one of a lead screw, a solenoid, a linear motor, and an air cylinder.

19. The robot of claim 17 wherein the means for extending and retracting the rod is provided within a holding means for allowing the extending and retracting means to be moved bidirectionally along a linear path parallel to the linear path of the rod.

* * * * *

UNITED STATES PATENT AND TRADEMARK OFFICE
CERTIFICATE OF CORRECTION

PATENT NO. : 5,429,009
DATED : July 4, 1995
INVENTOR(S) : COURT L. WOLFE, MEL SIEGEL, CHRISTOPHER J. ALBERTS, WILLIAM M. KAUFMAN It is certified that error appears in the above-indentified patent and that said Letters Patent is hereby corrected as shown below:

Title Page:
At [75] Inventors, change "Williams" to --William--

Signed and Sealed this

Seventeenth Day of October, 1995

Attest:

BRUCE LEHMAN

Attesting Officer     Commissioner of Patents and Trademarks